Dec. 2, 1969 E. J. KNIZE Re. 26,730
CAN CONTAINER AND THE LID THEREFOR
Original Filed March 4, 1966
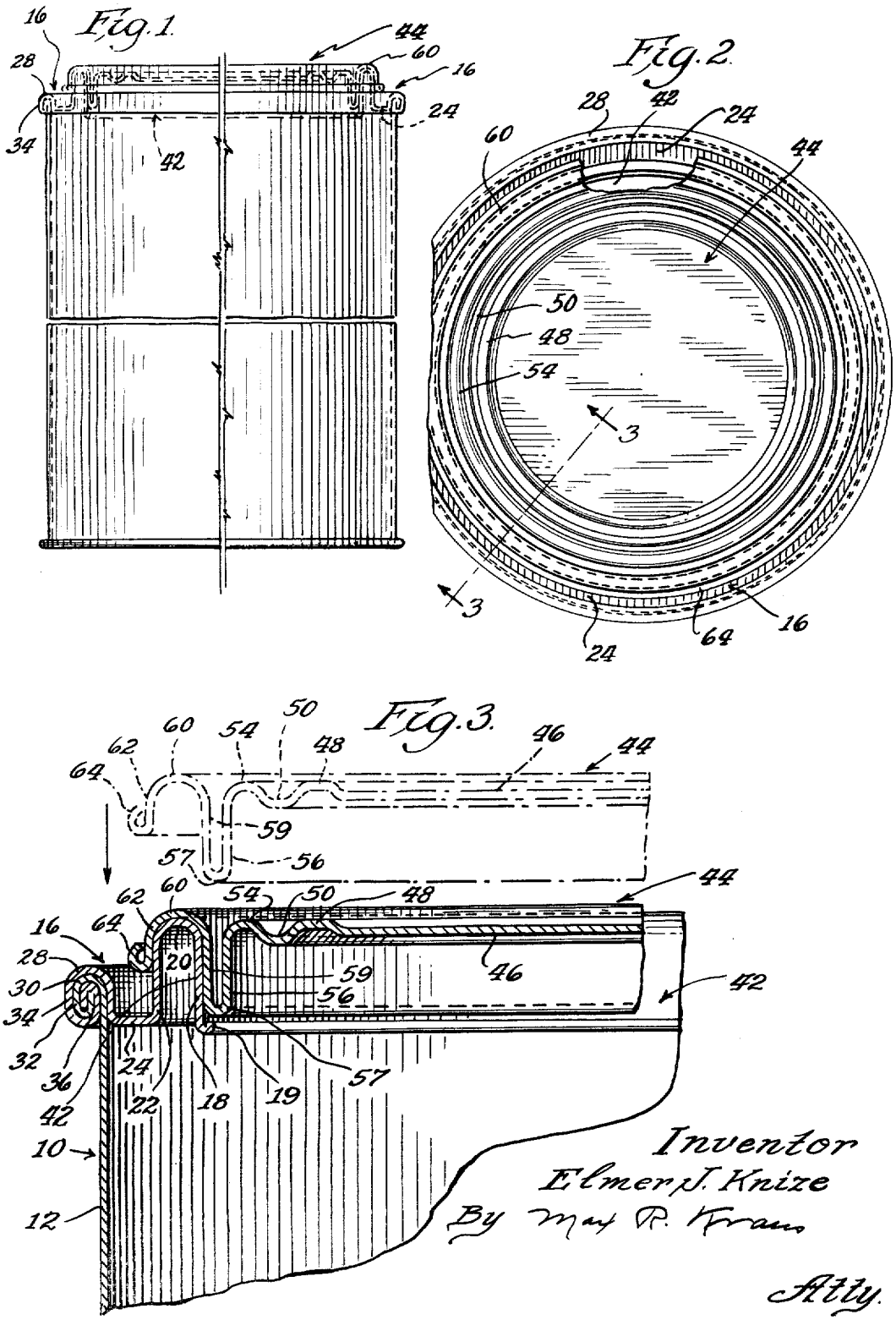

United States Patent Office

Re. 26,730
Reissued Dec. 2, 1969

26,730

CAN CONTAINER AND THE LID THEREFOR

Elmer J. Knize, Chicago, Ill., assignor of one-half to Daniel C. Avers, Chicago, Ill.

Original No. 3,383,006, dated May 14, 1968, Ser. No. 531,690, Mar. 4, 1966. Application for reissue Aug. 5, 1968, Ser. No. 753,814
Int. Cl. B65d *43/04*
U.S. Cl. 220—42 10 Claims

Matter enclosed in heavy brackets [ ] appears in the original patent but forms no part of this reissue specification; matter printed in italics indicates the additions made by reissue.

ABSTRACT OF THE DISCLOSURE

A container and a lid therefor in which the rim of the container has a U-shaped raised portion which is engaged by a complementary shaped portion on the lid to secure the lid to the rim of the container, *and in which the outer wall of the complementary U-shaped portion of the lid is equal to or shorter than the inner vertical wall of the lid and in which the inner wall of the U-shaped portion of the lid and the inner wall of the rim are equal to or greater than the friction engaging surfaces of the outer wall of the rim and the outer wall of the lid, and in which the inner wall of the lid is in frictional contact with the inner wall of the rim substantially along the entire length of the inner wall of the lid.*

This invention relates to improvements in the can or container and the lid therefor.

One of the objects of this invention is to provide a can or container with a top rim and a removable lid so constructed that paint and other foreign material will not fill any portion of the top rim and thereby prevent the reseating of the removable lid.

In conventional containers or cans for containing paint or the like, the friction groove of the top rim of the can or container usually fills with paint as the container is being used. This makes it difficult and in many cases impossible to reseat the removable lid in the friction groove to close the can. With the present invention these objections are overcome in that the rim and lid are so constructed that irrespective of the paint or like material which gathers in the rim it cannot interfere with the reseating of the lid. Thus, an effective closing of the can is possible at all times.

Other objects will become apparent as this description progresses.

In the drawings:

FIGURE 1 is a side view of the container with the lid applied.

FIGURE 2 is a top plan view of same, and

FIGURE 3 is an enlarged sectional view taken on line 3—3 of FIGURE 2, and also showing the lid unseated in broken lines.

The can or container, generally indicated by the numeral 10, comprises a circular body 12, a bottom 14 secured to the body 12, and a rim generally indicated at 16 secured to the top of the body.

The rim 16 is of circular shape and is formed to comprise an inner vertical wall 18 which terminates at its lower end in a rolled bead 19. The upper portion of the wall 18 is curved or arcuate shaped to form a rolled top surface 20 which continues downwardly, with an outer spaced vertical wall 22 which continues laterally with a horizontal bottom section 24, which continues vertically upwardly to form a spaced vertical wall 26, which then continues outwardly to form a rolled top surface 28 to receive therewithin the rolled upper edge 30 of the body

12 of the container. The upper edge 30 continues downwardly as at 32 within the downwardly extending portion 34 of the rim. The downwardly extending portion 32 of the can body is turned inwardly and upwardly and terminates at an edge 36. The downwardly extending portion 34 of the rim continues around the edge 36 of the can body as at 38 and terminates in a downwardly extending end 40. The rim is thus interlocked with the top of the can or container. The inner vertical wall 18 of the rim is adjacent the central can opening 42. The rolled top surface 20 extends above the plane of any other portion of the rim.

The lid generally indicated at 44 is of circular shape and comprises a central flat portion 46 with an annular raised portion 48 which continues downwardly to form a bend 50 and continues upwardly to form a reverse bend 54, and then continues downwardly to form a vertical wall 56, then is curved to form a bend as at 57 and continues upwardly to form a spaced inner vertical wall 59 which curves to form a rolled-up top portion 60 and then continues downwardly to form an outer wall 62 which terminates in an outwardly turned edge 64. The rolled-over top portion 60 of the lid extends above the top portion 54 of the lid.

The rolled portion 20 and the spaced vertical walls 18 and 22 of the rim form an inverted U-shaped configuration, and the portion of the lid comprising the rolled-over portion 60 and spaced vertical walls 59 and 62 likewise form an inverted U-shaped configuration, which may be termed the seating portion of the lid. The lid has a U-shaped portion formed by the walls 56, 59 and bend 57 and an adjacent inverted U-shaped seating portion.

As best seen in FIG. 3, the inverted U-shaped portion of the lid seats on and engages the inverted U-shaped portion of the rim. As will be seen, the rolled-over top portion 60 of the lid seats on and embraces the rolled top surface 20 of the rim, with the vertical wall 59 of the lid contiguous to and in engagement with the vertical wall 18 of the rim and the outer wall 62 of the lid contiguous to and in engagement with the upper portion of the vertical wall 22 of the rim.

Since both the rim and the lid are made of metal, a certain amount of "give" and compression of the metal takes place in the rim and the lid to effect a sealing therebetween. For example, the bend 20 and the vertical walls 18 and 22 of the inverted U-shaped portion of the rim will be compressed inwardly when engaged by the complementary inverted U-shaped portion of the lid. This effects a seal-tight fit between the lid and the rim.

The inverted U-shaped portion of the rim on which the lid seats cannot become filled with or covered by a paint or like material so as to affect the seating of the lid, for if any paint splashes or gets thereon it will, due to the shape of said member, roll down and will not accumulate on the surface, as would occur with containers having rims with conventional friction grooves in the rims.

*The exceptional configuration of this invention is compatable to high speed production methods to provide the required friction in the proper places to meet all sealing specifications demanded by industry.*

*The U-shaped configuration formed by walls 56–57 and 59 being of a length substantially equal to that of the walls 18–20–22 allows for greater tolerances in the manufacture of the rim and lid. The wall 59 will always be pressured and lie against wall 18 of the rim because of the pressure applied thereto by wall 56. This, of course, is because all strains and stresses emanate outwardly from the center point of the lid 44 towards the periphery of the lid when the lid is placed on the rim.*

*Thus, the U-shaped member (walls 56, 57 and 59) generates enough flexibility to make certain that the wall 59 seats against wall 18 at all times regardless of the im-*

*perfections in manufacturing even if the wall 18 may be out of vertical, or eccentricities in the circular shape of the cam rim and lid due to metal thickness variations caused by the stretch forming process. This self adjusting feature is present because of the presence of bends 54 and 57 and wall 56 which when taken together exerts an outward force when the lid is placed on the rim of the container on wall 59 to insure positive contact against wall 18.*

[It will be understood that various changes and modifications may be made from the foregoing without departing from the spirit and scope of the appended claims.]

What is claimed is:

1. A container and a lid for closing said container, said container having a rim, said rim having a raised portion extending inwardly of the side wall of the container, said raised portion being of an inverted U-shape which comprises an outer vertical wall, a spaced inner vertical wall connected by an arcuate-shaped top to said outer vertical wall, said lid having a seating portion which is of an inverted U-shape which comprises an outer vertical wall and a spaced inner vertical wall connected by an arcuate-shaped top, said outer vertical wall of the lid being equal to or shorter than the inner vertical wall of said lid, said lid seating portion adapted to overlie and frictionally engage the raised portion of the rim with the vertical walls of the lid seating portion *frictionally* engaging the vertical walls of the rim raised portion, *and the friction engaging surfaces between the inner wall of the lid and the inner wall of the rim being equal to or greater than the friction engaging surfaces of the outer wall of the rim and the outer wall of the lid, said inner vertical wall of the lid being substantially parallel with the inner wall of the rim and in frictional contact therewith substantially along the entire length of the inner wall of the lid,* said outer vertical wall of the lid having a peripheral edge positioned inwardly of the side wall of the container.

2. A structure defined in claim 1 in which the inner wall of the lid forms one side of a U-shaped configuration which extends inwardly of said inner wall of the lid.

3. A structure defined in claim 1 in which the inner vertical wall of the raised rim portion is adjacent the central opening of the rim.

4. A structure defined in claim 1 in which the outer wall of the raised portion of the rim is spaced inwardly of the side of the container and in which the peripheral edge of the lid is positioned in said space.

5. A structure as defined in claim 1 in which the top of the raised portion extends above the plane of any other portion of the rim.

6. A structure as defined in claim 1 in which the top of the seating portion of the lid extends above the plane of any other portion of the rim.

7. A structure defined in claim 1 which is made of metal and in which the spaced vertical walls of the rim are compressed when the seating portion of the lid is in engagement therewith.

*8. A structure as defined in claim 1 in which the inner wall of the lid forms one side of a U-shaped configuration which extends inwardly of the inner wall of the lid and in which the other side of said last mentioned U-shaped configuration continues to form a reverse bend at its upper end and extends inwardly of said last mentioned inner side.*

*9. A structure as defined in claim 8 in which the reverse bend continues inwardly to form another reverse bend which is in an opposite direction to the first reverse bend.*

*10. A structure as defined in claim 9 in which the opposite reverse bends are of generally arcuate-shape and in which the last mentioned reverse bend continues inwardly to form the main top wall of the lid.*

References Cited

The following references, cited by the Examiner, are of record in the patented file of this patent or the original patent.

UNITED STATES PATENTS

| | | | |
|---|---|---|---|
| 1,206,475 | 11/1916 | Shalita et al. | |
| 2,734,654 | 2/1956 | Roberson. | |
| 2,273,247 | 2/1942 | Barnby et al. | 220—42 |
| 3,160,542 | 12/1964 | Foye | 220—42 |

JAMES B. MARBERT, Primary Examiner